Jan. 3, 1950  R. W. POINTER  2,493,025
BEAM SUSPENSION FOR VEHICLES
Filed Dec. 3, 1945  5 Sheets-Sheet 1

Robert W. Pointer
INVENTOR
BY
ATTORNEY

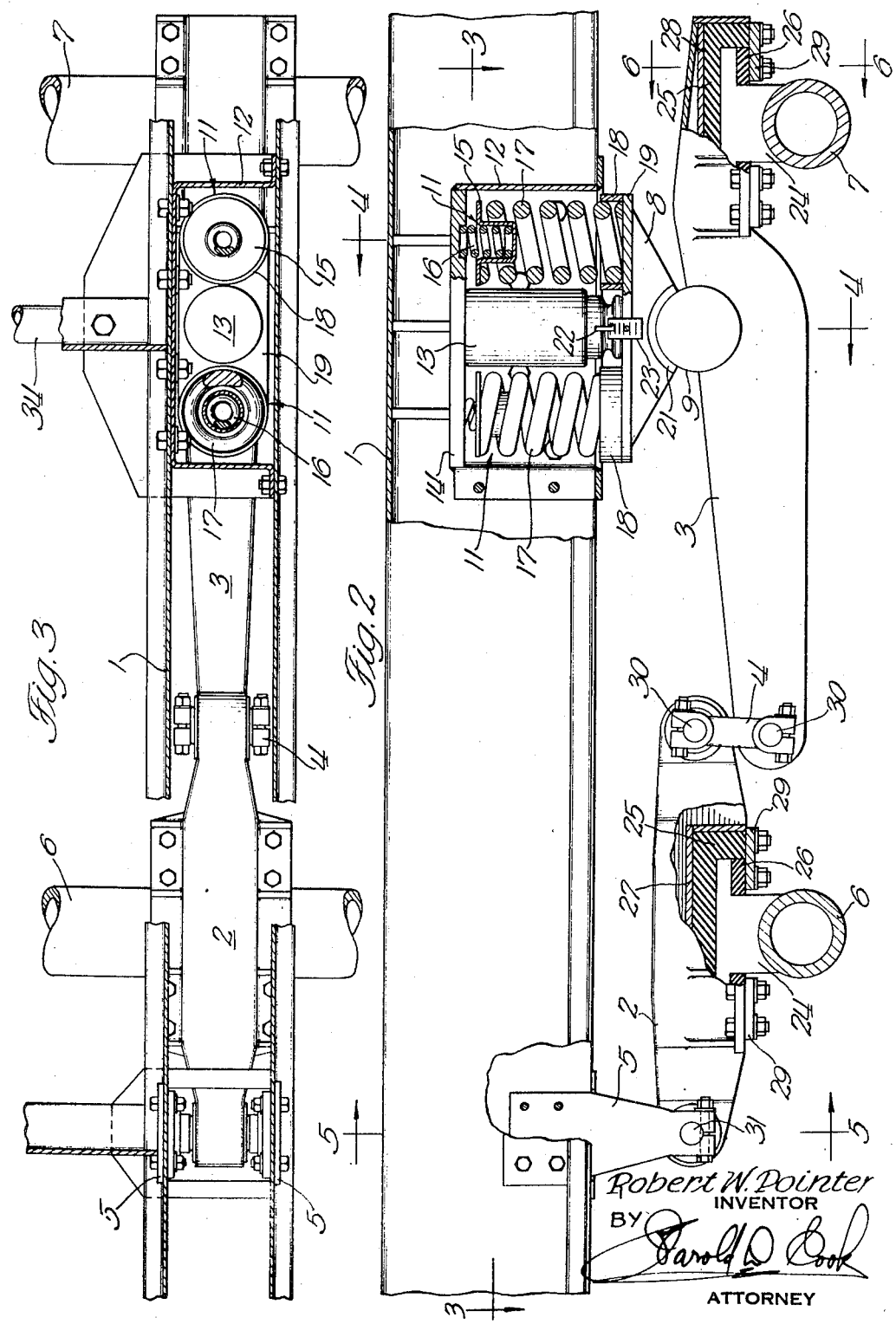

Jan. 3, 1950 R. W. POINTER 2,493,025
BEAM SUSPENSION FOR VEHICLES
Filed Dec. 3, 1945 5 Sheets-Sheet 3
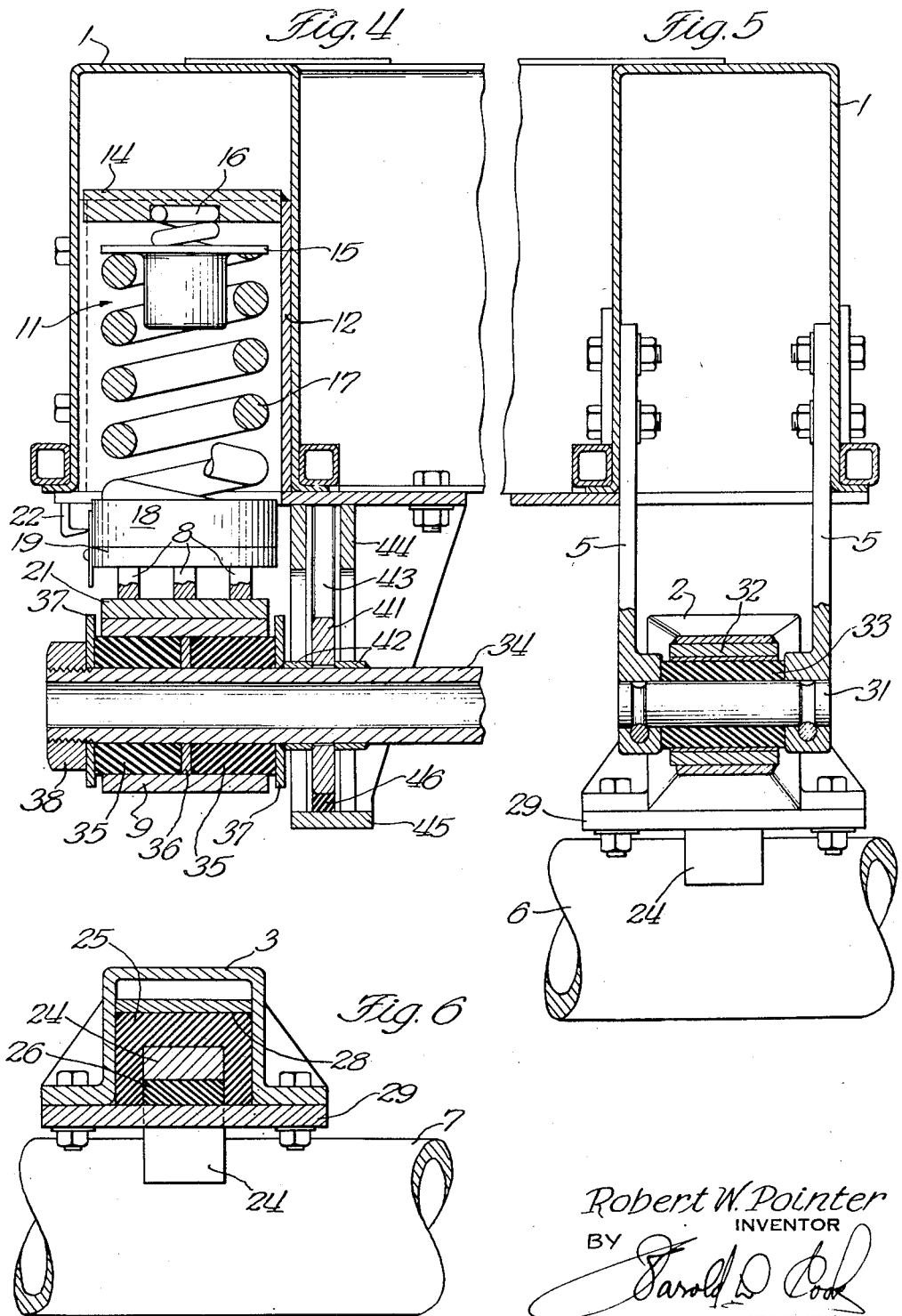
Robert W. Pointer
INVENTOR
BY
ATTORNEY Jan. 3, 1950 R. W. POINTER 2,493,025
BEAM SUSPENSION FOR VEHICLES
Filed Dec. 3, 1945 5 Sheets-Sheet 4
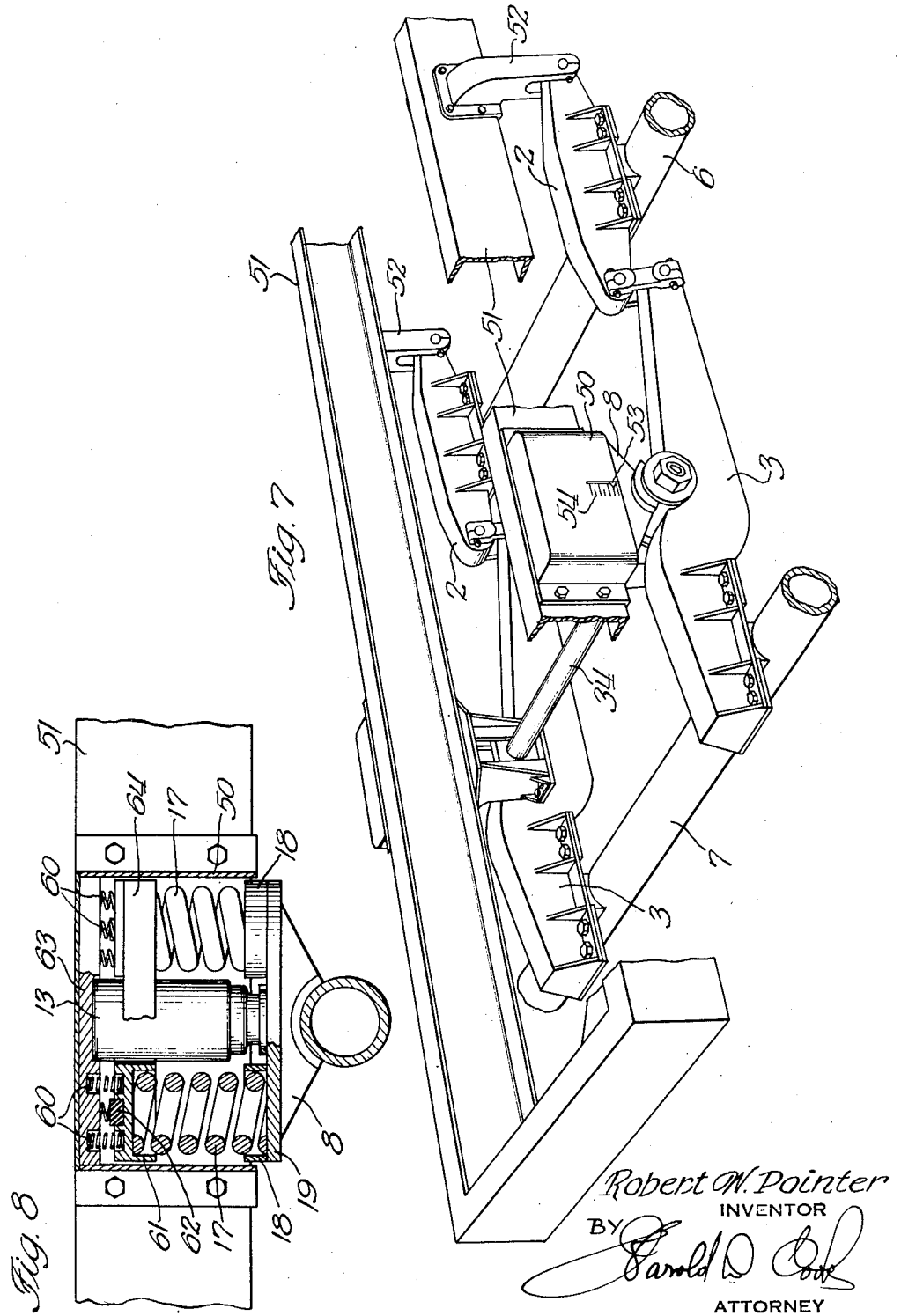
Robert W. Pointer
INVENTOR
BY
Harold D. Cook
ATTORNEY Jan. 3, 1950     R. W. POINTER     2,493,025
BEAM SUSPENSION FOR VEHICLES
Filed Dec. 3, 1945     5 Sheets-Sheet 5

Robert W. Pointer
INVENTOR

BY Harold D. Cook
ATTORNEY

Patented Jan. 3, 1950

2,493,025

UNITED STATES PATENT OFFICE 2,493,025

BEAM SUSPENSION FOR VEHICLES

Robert W. Pointer, Portland, Oreg.

Application December 3, 1945, Serial No. 632,549

24 Claims. (Cl. 280—104.5)

This invention relates to improvements in vehicle suspension, and has particular reference to single and dual axle walking beam suspensions for automotive vehicles.

The general object of the invention is to provide an improved suspension for heavy vehicles such as trucks, full trailers, semi-trailers, and the like.

A particular object of the invention is to provide a suspension possessing better riding qualities over a wide variation in loading than conventional suspensions, and one which will retain these qualities throughout indefinitely long periods of use without lubrication, or other servicing.

Another object is to provide a suspension having the above described characteristics which is extremely rugged and durable, and which, at the same time, has relatively few parts so as to be less expensive to manufacture and more quickly and easily assembled and disassembled than conventional suspensions.

A further object is to provide a suspension having relatively compact and light weight load carrying springs which may be housed within certain types of vehicle frame and which may readily be replaced on the road if desired, without requiring special tools or garage equipment.

A further object is to provide a novel suspension of such a nature that in the event of spring breakage the vehicle may proceed on a broken spring to a garage or other convenient place for repair without having a break-down on the road.

A further object is to provide a suspension which is entirely free of lubrication requirements so that it may run indefinitely between load pick-up and delivery points without harm from lack of periodic lubrication or other servicing.

A further object is to provide a dual axle suspension which is sufficiently flexible to allow the wheels on the two axles to track on curves to avoid dragging and scuffing of the tires.

A further object is to provide a suspension which is easily convertible from a single axle suspension to a dual axle suspension, and vice versa.

A still further object is to provide a walking beam suspension having tubular trunnions carrying a major portion of the weight of the vehicle and having a trunnion guide shaft carrying no load for maintaining the walking beams in correct position and alignment on opposite sides of the vehicle.

These and other objects will become apparent as the description proceeds with reference to certain preferred embodiments illustrative of the princip'es of the invention. The particular constructions herein shown and described are to be construed as illustrative only, and not as limiting the invention.

The present suspension comprises, in its most comprehensive form, interconnected front and rear walking beams, each carrying an axle for the road wheels of the vehicle. The front walking beam is pivotally mounted at its forward end to the vehicle frame or chassis, and is shackled or otherwise pivotally connected at its rear end to the forward end of the rear walking beam. The rear walking beam supports a major part of the weight of the vehicle on a trunnion intermediate its ends and has its load carrying axle attached near its rearward extremity. A resilient assembly comprising load carrying springs is arranged to support the vehicle frame on the rear walking beam trunnion.

The trunnions on opposite sides of the vehicle are resiliently interconnected by a transverse trunnion guide shaft which carries no load. This guide shaft is guided in vertical movements by guide boxes attached to the frame of the vehicle which resist side thrust and maintain the walking beams in correct position and alignment vertically beneath longitudinal members of the vehicle frame.

The manner in which the two walking beams are hung on the frame and pivotally connected together equalizes the torque reaction of the axles on the suspension system from braking or driving the wheels so that undesirable effects heretofore encountered in dual axle suspensions are eliminated. When torque is applied to the load carrying wheels, either for driving or braking, the reactions are neutralized through the inter-beam connection so that there is no tendency for one axle or the other to lift off the ground and transfer a disproportionate share of the weight to the other axle as occurs in many conventional dual axle suspensions. Such action causes excessive tire wear, particularly in sudden stops.

The various pivotal connections of the two walking beams and the connections between the walking beams and the load carrying axles are all cushion mounted in a manner to provide an inherent resilience and flexibility in the system and to obviate the necessity for lubrication in any part of the system. The flexibility of the present suspension is such that the two load carrying axles may effect self-steering in rounding curves, so as to avoid dragging and scuffing of the tires. On the straightaway, however, the cushion mountings and the arrangement of the inter-beam connections are effective to maintain the proper alignment of the axles.

Coil springs are employed in the present embodiments as resilient members to carry the load on the trunnions and are arranged so as to be readily removable and replaceable in case of breakage. The mounting and arrangement of the suspension is such that if a load carrying spring should break, the vehicle may, nevertheless, proceed to a garage or other convenient place for repair without causing a breakdown on the road. However, if the vehicle is supplied with extra springs and an adequate jack or other lifting device, one or more of the present springs may easily be replaced by roadside repair without special tools. With the present suspension, this is entirely feasible, because the springs are relatively small and light in weight, and spare units may easily be carried on runs where garage facilities are not readily available.

The spring assemblies preferably include secondary or underload springs which provide for springing the vehicle when empty or substantially unloaded. When the vehicle carries a considerable weight, the main springs assume the load and may have associated therewith a simple scale indicator to designate the load in tons or to indicate merely whether the load is safe or excessive. The combination of heavy main springs and light underload springs to make the vehicle ride approximately the same whether loaded or empty is of special advantage in connection with certain kinds of hauling where the vehicle ordinarily takes a full load in one direction and returns empty, as in the case of tank trailers particularly. Heretofore, the rough riding resulting from the unloaded condition of heavy springs designed to support a great weight has been very damaging to tank truck and trailer units making return trips empty at relatively high speed, resulting in the continual occurrence of new leaks in the tank seams. The spring assemblies also include shock absorber units to control the spring action in both loaded and unloaded conditions of the vehicle. The coil spring assemblies are very compact in comparison with conventional heavy duty automotive leaf spring suspensions and may be mounted on the outside of channel type frames, or entirely within a frame of inverted U-shape. The coil springs require no lubrication.

By eliminating the front walking beams the rear walking beams may be utilized as a single axle suspension embodying the principal features of the invention. The arrangement is such as to facilitate conversion to either single or dual axle suspension as may be desired.

Preferred embodiments of the invention are illustrated in the accompanying drawings in which:

Figure 2 is an elevational view with parts broken away looking in the direction of the arrows 2—2 of Figure 1;

Figure 3 is a longitudinal sectional view taken on the line 3—3 of Figure 2;

Figure 4 is an enlarged cross sectional view through the trunnion and spring housing assembly, taken substantially on the line 4—4 of Figure 2;

Figure 5 is an enlarged cross sectional view through the front walking beam bracket taken on the line 5—5 of Figure 2;

Figure 6 is an enlarged sectional view through the rear walking beam axle cushion seat, taken on the line 6—6 of Figure 2;

Figure 7 is a perspective view similar to Figure 1, showing a modified arrangement wherein the present dual beam suspension is applied to a channel type vehicle frame;

Figure 8 is a side elevational view, with parts broken away, of the spring assembly in the embodiment of Figure 7, showing a different arrangement of the underload springs;

Figure 1:
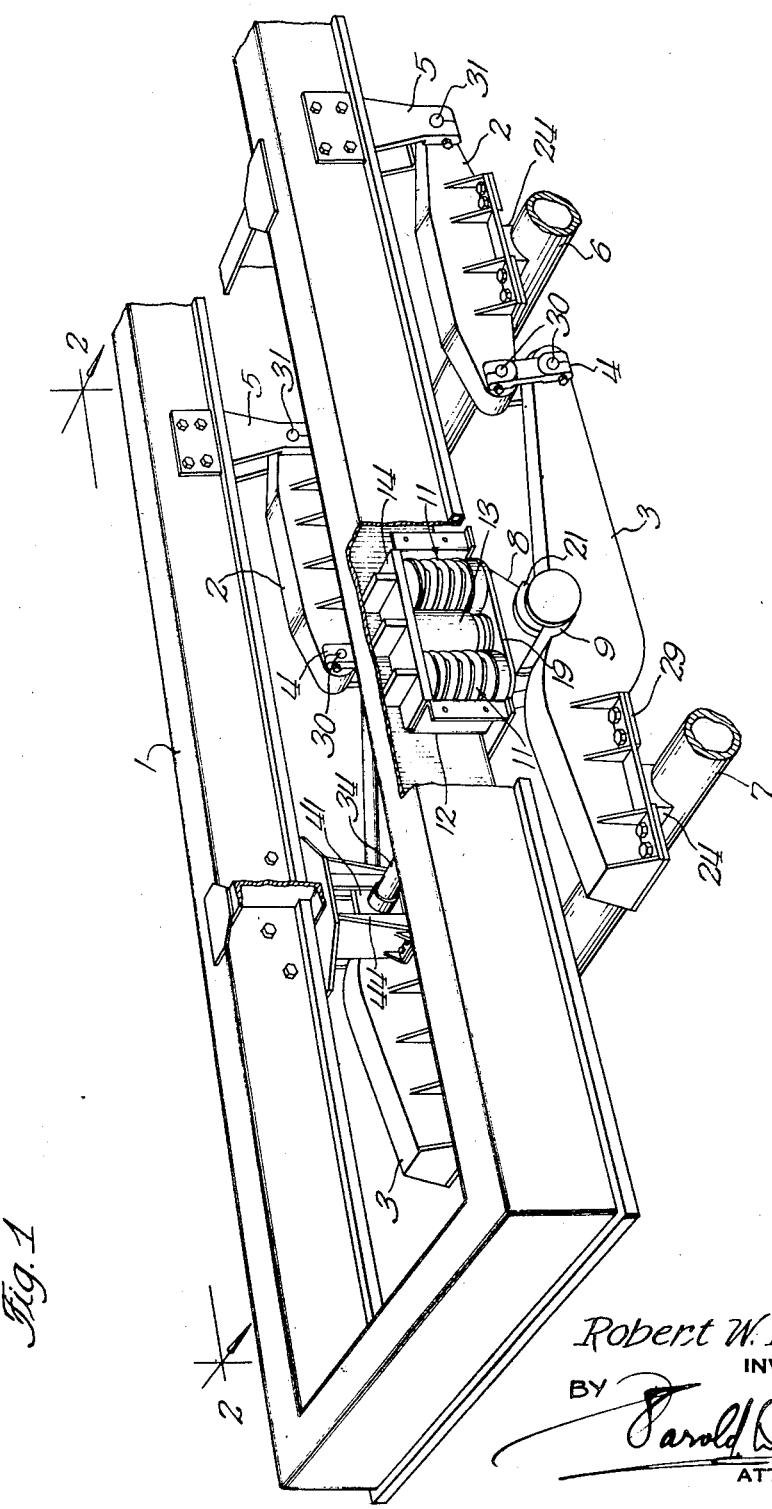
Figure 1 is a perspective view with parts broken away of a vehicle chassis having a U-type frame equipped with a dual beam, dual axle suspension embodying the principles of the invention.

Referring first to Figure 1, the numeral 1 designates the chassis or frame of the vehicle to which the present suspension is applied, and which may be, for instance, a full trailer or semi-trailer, only the rear part thereof being illustrated. The individual frame members are of inverted U-shape in cross section. Front and rear walking beams of hollow box construction rectangular on cross section are indicated at 2 and 3, these beams being linked together by a shackle 4. The front walking beam 2 is pivotally connected at its forward end with the frame 1 by means of a bracket 5, and carries an axle 6 near its mid-point. The rear walking beam 3 carries an axle 7 at its rear end and supports a spring rider 8 upon a trunnion 9 intermediate its ends. A major portion of the weight of the vehicle is transmitted to the spring rider 8 through a plurality of coil springs comprising a spring assembly 11.

The nature of the various connections between the parts, and the construction and arrangement of the trunnion and load supporting spring assemblies, will now be described in detail with particular reference to Figures 2 to 6. The numeral 12 designates a spring housing enclosing the spring assembly 11 and a shock absorber mechanism 13. The shock absorber mechanism itself forms no part of the present invention, and will not be described in detail. Its function is to control the spring action to prevent rebound and oscillation. A preferred form of shock absorber is disclosed in the patent to Dath, No. 2,373,813, issued April 17, 1945.

The spring housing 12 carries a spring base plate 14 rigidly secured within the channel of the frame 1 where the size and shape of the longitudinal frame members permit such an arrangement. Spring cups 15 carry and guide light underload springs 16 seated in the base plate 14, these cups being themselves seated in the upper ends of main load supporting springs 17 in the manner shown in Figure 2. The lower ends of the main springs 17 are seated in lower spring cups 18 on a spring rider plate 19 comprising a part of the spring rider designated generally at 8. The shock absorber mechanism 13 reacts against the base plate 14 and the rider plate 19 to control the spring action of the system. The lower part of the spring rider 8 is provided with an arcuate trunnion saddle bearing 21 resting upon the tubular trunnion element 9 directly beneath the channel frame member 1. The trunnion 9 itself comprises a short length of steel tube welded into the rear walking beam 3 so as to present approximately 180° of cylindrical bearing surface within the saddle 21 which has an arcuate extent considerably less than 180°.

For indicating the load supported by the dual axle suspension a pointer 22 may be attached to the housing 12 so as to give an indication of the amount of spring compression upon a scale 23 attached to the spring rider plate 19. This load indicator is claimed in my copending application for Vehicle load indicator, Serial No. 632,551, filed December 3, 1945.

The axles 6 and 7 are welded to T-castings 24 mounted in rubber cushions 25 and 26 in axle cushion seats 27 and 28 in the two walking beams, respectively, the parts being secured in the seats by adjusting and retaining clips 29. It will be seen that the arrangement of the rubber cushions surrounding the T-blocks in the axle cushion seats is such as to provide for resilience of the axles for limited movement and twisting in all directions without metal to metal contact.

Referring now to Figure 5, the front walking beam bracket 5 takes the form of parallel vertical arms supporting the opposite ends of a pin 31, when the vehicle frame is of U-section, so that the walking beams are hung directly beneath the frame members. The walking beam 2 is provided at its forward end with a tubular bearing member 32 containing a tubular rubber bushing 33 surrounding the pin 31. The shackle 4 is provided with shackle pins 30 having rubber bushings similar to the bushing 33 whereby all the pivoted connections at the ends of the walking beams are resiliently rubber mounted.

The elements of the suspension thus far described provide for supporting the weight of the vehicle frame upon the walking beams through the front walking beam bracket 5 and the trunnion 9 so as to distribute the load on the axles 6 and 7. The front walking beam 2, by its pivotal connection with the bracket 5, is hereby attached to the vehicle frame, but no such attachment exists between the trunnion 9 and the bearing segment 21 which constitutes merely a saddle on the trunnion. Means will, therefore, now be described for retaining the saddle bearing 21 in place upon the trunnion 9 to maintain positively the proper positioning of the parts so that they cannot be displaced by bouncing or jacking up the frame.

Referring particularly to Figures 1 and 4, it will be seen that the tubular trunnions 9 on opposite sides of the frame are resiliently connected by a trunnion shaft 34 carrying no weight and mounted at its ends in rubber trunnion bushings 35. The arrangement of the trunnion shaft 34 within each trunnion 9 is somewhat similar to the previously described mounting of the pins 30 and 31 in the beam ends whereby a limited amount of twisting and other relative movement between the parts is provided by the rubber bushing. The trunnion 9, however, contains two of the bushings 35, disposed on opposite sides of an abutment comprising a washer 36 welded into the center of the trunnion tube, these bushings extending beyond the ends of the trunnion tube and being confined between a pair of washers 37. A trunnion guide block 41 is maintained loosely but in a fixed position on the trunnion shaft 34 between a pair of spacer sleeves 42, the inner one of which is to form an abutment against which the end nut 38 may be tightened to hold the part in place and to compress the bushings 35 welded to the trunnion shaft.

The trunnion guide block 41 is square in shape and slides in vertical channels 43 in a trunnion guide box 44 constituting an integral part of the spring housing 12 extending downwardly beneath the vehicle frame. The lower ends of the channels 43 are closed by a bottom plate 45 carrying a rubber cushion 46 to limit the movement of the trunnion guide block 41 in its lowermost position. Thus the trunnion shaft 34 and trunnions 9 are constrained by the channels 43 in the trunnion guide boxes on opposite sides of the vehicle for a limited vertical movement under spring action of the springs 16 and 17 as determined by the height of the guide boxes. The rubber cushion 46 at the bottom of each guide box thereby limits the extent to which the corresponding trunnion 9 can drop beneath the frame in rebound on a rough road or in jacking up the frame. When the weight of the vehicle is resting upon the trunnion, the springs 16 and 17 will be somewhat compressed so as to cause the trunnion guide block 41 to ride in an intermediate portion of the channel 43 for free spring action in travelling.

It will be observed that although the load supporting axles are rigidly welded to their respective T-blocks, and although the trunnion shaft 34 is itself constrained by the trunnion guide box 44 against movement longitudinally of the frame, the rubber trunnion bushings 35, the axle cushion seats 25 and 26, and the rubber shackle pin bushings and the rubber bushing 33 associated with the front walking beam bracket 55, do provide resilience for limited movement of the various parts in longitudinal as well as other directions. This construction is sufficiently flexible to enable the axles 6 and 7 to alter their alignment for self steering on highway curves by moving slightly closer together on one side of the vehicle and slightly farther apart on the other side. Such shifting of the axle ends in self steering produces also a certain amount of relative longitudinal movement of the two walking beams, the beams on the outside of the curve moving apart and the beams on the inside of the curve moving toward each other. The shackles 4 normally hang approximately vertically, and, being loaded in tension, tend to maintain a vertical position thereby exerting a restoring force to return the beams to their normal positions for parallel alignment of the axles after the vehicle has rounded a curve and resumes a straight forward parth of travel. The suspension system as a whole is, therefore, inherently stable while at the same time possessing a flexibility and resilience to accommodate itself to variable road conditions.

The various bushings also obviate the necessity for any lubrication or other regular periodic service whatsoever, enabling the vehicle, if it be a trailer unit, to be hauled between pick-up and delivery points and left at some such station for loading or unloading while the tractor unit is being serviced.

The axle cushion mountings are disclosed and claimed in my prior Patent No. 2,238,002, issued April 8, 1941, for Cushion seat for trailer axles. The specific construction of the present spring assembly and guide box are disclosed and claimed in my copending application for Letters Patent for Resilient suspension for vehicles, Serial No. 632,550, filed December 3, 1945.

In the present embodiment of the invention the axle 6 is hung in the center of the beam 2 so that the supporting reaction force of this axle is equally distributed between the bracket 5 and the tension shackle 4. On the beam 3 the axle 7 overhangs the trunnion 9 on a lever arm one-half the length of the opposite lever arm between the trunnion and the shackle. The axles are thereby equally loaded, while the bracket 5 supports one-half the weight carried by one axle, and the trunnion 9 carries the remainder, or one and one-half times the weight carried by one axle. The downward force on the shackle 4 from the rear walking beam exactly balances the upward force on the shackle from the front walking beam, and this equation holds true for torque reactions as well as weight reactions, to maintain a balanced system under all conditions affecting both axles. Conditions affecting the axles individually, such as road shocks, produce a combination of movements comprising pivotal interaction of the two walking beams and spring deflection, occurring simultaneously, to absorb most of the shock without transmitting it to the vehicle frame. Thus, considerable adjustment for road irregularities is accomplished by the interplay of the walking beams themselves without raising or lowering the supporting bracket 5 or trunnion 9. When the vertical movements of the two axles are not compensatory in this manner, the spring assembly must deflect, and since this assembly carries three times the weight carried by bracket 5 the latter will not transmit appreciable shock to the vehicle frame.

It is also contemplated that the present suspension be used for driving wheels on trucks, tractor units and the like. The torque neutralizing characteristic of the walking beam linkage is of advantage in driving as well as in braking, to maintain the desired load distribution on the dual axles to obtain maximum tractive effort under all conditions of operation.

Figure 7 shows the present suspension adapted for a channel type vehicle frame construction. In this case the spring housing assemblies 50 are carried outside of the longitudinal frame members 51. This arrangement calls for a slightly different design of the front walking beam brackets 52 so as to hang the walking beams outside of the frame members instead of vertically therebeneath. In Figure 7 the load indicating pointer 53 is attached to the spring rider 8 for relative movement with respect to a scale 54 carried on the spring housing 50 which is secured to the frame. The arrangement of the walking beams in Figure 7 is the same as that shown in Figure 1.

A modified arrangement of the underload springs in spring housing 50 is shown in Figure 8. Four or more underload springs 60 are grouped above each main spring 17, being arranged symmetrically in the manner shown. The main springs 17 are seated in spring cups 18 on a rider plate 19 as in the construction hereinbefore described, but their upper ends seat in spring cups 61 on the under side of a floating spring plate 64 which is arranged to seat the underload springs 60 in clusters on its upper side around a central rubber bumper or stop 62, above each of the springs 17. The upper ends of spring 60 are seated in a spring base plate 63 rigidly attached to the vehicle frame. The shock absorber 13 reacts between the rider plate 19 and the base plate 63 to control the spring action of the whole assembly regardless of whether the vehicle is empty or loaded. When empty, or lightly loaded, the vehicle is sprung chiefly on the underload springs 60. When heavily loaded, the base plate 63 compresses the light underload springs 60 and bears upon the bumpers 62 so as to transmit the load directly to the main springs 17.

The spring assembly of Figure 8 may be embodied in a unit for U frame vehicles where it is desired to employ more than one underload spring for each main spring. In the spring assembly shown in Figures 1 and 2 the number of underload springs is necessarily limited to one for each main spring. The characteristics and requirements of the vehicle will dictate the nature of the spring action desired in the underload springs to determine which arrangement to use. A single underload spring in each main spring has the advantage of compactness and fewer parts, while the use of a plurality of underload springs has the advantage of using smaller springs and enabling a greater range of variation in spring rate, natural frequency of oscillation, etc., by varying the number of springs. Also, where several springs are used the failure of one is of less serious consequence to the suspension mechanism.

Figure 9:
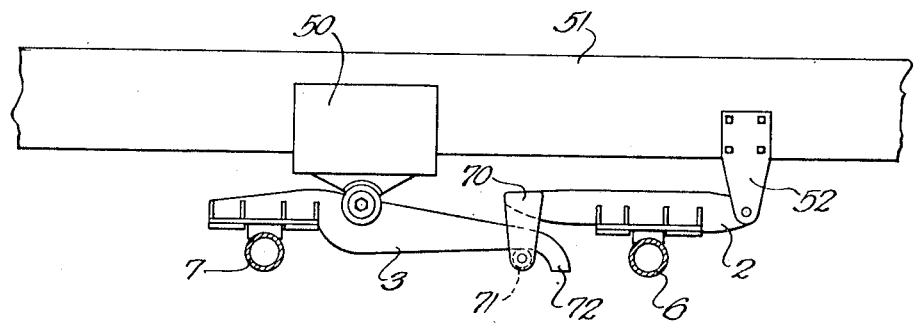
Figure 9 is a side view of a modified dual beam suspension employing a different kind of linkage for interconnecting the beams.

Figure 9 illustrates an alternative arrangement for pivotally interconnecting the two beams without the use of a shackle. In this case the free end of the beam 2 is equipped with a stirrup 70 having a roller 71 on which the free end of the beam 3 rides. The end of the beam 3 is turned downwardly to form a hook 72 which is effective to prevent casual displacement of the end of the beam from the stirrup, but which permits the beam to be readily separated in dismantling the suspension. The direction of the reaction forces from the loading of the two axles causes the end of the beam 3 to constantly bear upon the roller 71 with a force equal to one-half the individual wheel loading to maintain the parts always in the relationship shown. The stirrup 70 is representative of various articulating hangers which may be devised by persons skilled in the art to provide a pivotal connection between the beams. While this construction is illustrated as a modification of the embodiment shown in Figure 7, it is obviously equally applicable to the embodiment shown in Figure 1 as the resilient suspension assembly may be either attached to the outside of a channel shaped frame in the manner of spring assembly 50, or housed within a U-shaped frame in the manner of spring assembly 11.

Figure 10:
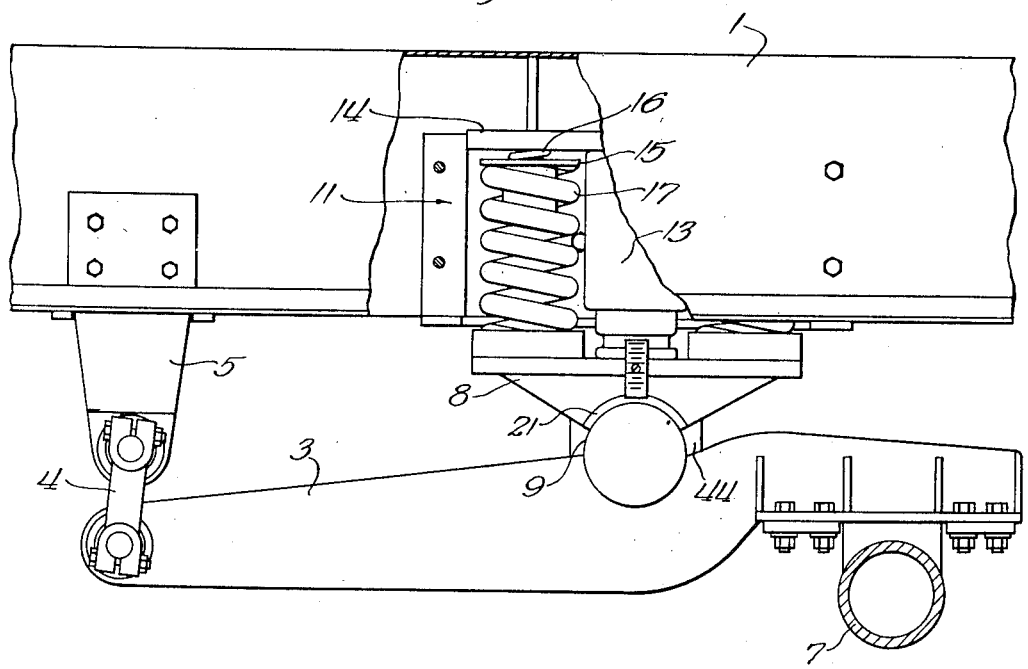
Figure 10 is a side view of a modification illustrating a single axle conversion of the present dual axle suspension.

Figure 10 illustrates how the present dual beam, dual axle suspension may readily be converted into a single beam, single axle suspension. The front walking beam 2 is eliminated by merely moving the mounting bracket 5 to the position shown for connection with the shackle 4. The bracket then becomes a tension member instead of a compression member, and carries a tension load equal to one-half the upward reaction force exerted by one end of the axle 7. The resilient suspension assembly 11 is then subjected to compression load equal to one and one-half times the loading on the end of the axle, as in Figures 1 and 7. When the axle is subjected to vertical movement in passing over irregularities in the road, the vertical movement of the trunnion 9 and spring rider 8 is only two-thirds as great as that of the axle. The action of the beam 3 and the resilient suspension assembly 11 is substantially the same in all respects as in the previous embodiments, except that the beam is not affected by movements of another beam connected therewith. The trunnions 9 are resiliently interconnected by a transverse trunnion guide shaft which is guided in vertical movement by the guide boxes 44 on opposite sides of the vehicle to keep the beams in the proper positions under the vehicle. This suspension can readily be converted into a dual axle suspension by moving the bracket 5 forward to its original position and installing the beam 2. Thus an additional advantage of the present suspension system is its ready conversion to either single or dual axles.

Additional changes in the construction and arrangement of parts may be resorted to to accommodate the invention to various types of vehicle frames, and to support loads of different weights, and all such modifications as fall within the scope of the appended claims are included in the invention.

Having now described my invention and in what manner the same may be used, what I claim as new and desire to protect by Letters Patent is:

1. A vehicle suspension comprising a first walking beam pivotally mounted at one end on the vehicle, an axle carried by said first beam, a second walking beam pivotally connected at one end with the other end of said first walking beam, an axle carried by said second walking beam, and a resilient trunnion support for the vehicle on said second walking beam.

2. A vehicle suspension comprising a first walking beam pivotally mounted at one end to the frame of the vehicle, an axle carried by said first beam, a second walking beam pivotally connected at one end with the other end of said first walking beam, an axle carried by said second walking beam, a trunnion on said second walking beam, and a resilient support for said frame bearing on said trunnion.

3. A vehicle suspension comprising a first walking beam pivotally mounted at one end to the frame of a vehicle, an axle carried by said beam, a second walking beam pivotally connected at one end with the other end of said first walking beam, an axle carried by said second walking beam, a resilient trunnion support for the vehicle frame on said second walking beam, cushion seats for said axles in said beams, and resilient members in said pivotal connection and mounting to provide sufficient flexibility in said suspension to facilitate self steering of said axles to avoid lateral dragging of the vehicle wheels around curves.

4. A dual beam, dual axle vehicle suspension comprising a front walking beam pivotally and resiliently mounted at its front end to the vehicle frame, an axle resiliently carried by said beam, a rear walking beam pivotally connected at its front end with the rear end of said front walking beam, an axle resiliently carried by said rear walking beam, a trunnion support on said rear walking beam, a saddle bearing for carrying a part of the weight of the vehicle on said trunnion, a trunnion shaft carrying no load resiliently interconnecting said trunnions on walking beams of the type described on opposite sides of the vehicle and a guide means associated with said trunnion shaft for guiding the latter in limited vertical movement.

5. A dual beam, dual axle vehicle suspension comprising a front walking beam pivotally mounted at its front end to the vehicle frame, an axle carried by an intermediate portion of said beam, a rear walking beam pivotally connected at its front end with the rear end of said front walking beam, an axle carried by the rear end of said rear walking beam, and a resilient trunnion support for the vehicle frame intermediate the ends of said rear walking beam, whereby driving and braking torques on said axles react in opposition to each other through said pivotal connection to maintain a predetermined weight distribution on said two axles regardless of the magnitude of said torques.

6. In a dual beam, dual axle vehicle suspension, a first rigid walking beam pivotally connected to the frame of the vehicle, an axle carried by said first walking beam, a second rigid walking beam providing trunnion support for the frame of the vehicle, said second walking beam carrying an axle and having a pivotal connection with said first walking beam, and a trunnion shaft mounted for free vertical movement with respect to the frame of the vehicle and carrying no load interconnecting said trunnion supports between said second walking beams on opposite sides of the vehicle to maintain proper spacing thereof.

7. In a dual beam, dual axle vehicle suspension, interconnected front and rear walking beams each carrying an axle, a pivotal connection between the front walking beam and the frame of the vehicle, and a resilient trunnion support for the vehicle upon the rear walking beam, said support comprising a trunnion integral with the rear walking beam, a saddle bearing on said trunnion, a resilient member supporting the vehicle frame upon said saddle, and a guide box, a trunnion shaft carrying no load interconnecting said trunnions on opposite sides of the vehicle, and a trunnion guide block carried by said trunnion shaft and slidable in said guide box for guiding said trunnions for limited vertical movement with respect to said frame to accommodate the action of said resilient member.

8. A dual beam, dual axle vehicle suspension for vehicles having longitudinal frame members of inverted U cross section, comprising interconnected front and rear walking beams, a bracket on one of said longitudinal frame members for pivotally connecting one of said walking beams directly beneath said member, and a resilient trunnion support mounted within said frame member for pivotally supporting said frame on the other walking beam.

9. A dual beam, dual axle vehicle suspension for vehicle frames of inverted U cross section, comprising interconnected front and rear walking beams, a bracket on a longitudinal member of said frame for pivotally connecting one of said walking beams directly beneath said member, a tubular trunnion integral with said other walking beam, a saddle bearing on said trunnion, a resilient member mounted within said frame and supporting said frame on said saddle, a trunnion shaft carrying no load interconnecting said trunnions on opposite sides of the vehicle, and a guide box rigid with said vehicle frame for preventing endwise movement of said trunnion shaft while permitting vertical movement thereof to allow for vertical action between said trunnions and said frame.

10. A dual beam, dual axle vehicle suspension for use with vehicle frames having longitudinal members of inverted U cross section, comprising front and rear walking beams, means for pivotally mounting one of said walking beams directly beneath a frame member, a trunnion on the other walking beam and a resilient supporting assembly mounted within said frame member and having a saddle bearing on said trunnion in vertical alignment with said frame member.

11. A vehicle suspension comprising a front walking beam pivotally mounted at its front end to the frame of the vehicle, an axle carried by said beam, a rear walking beam connected by a shackle at its front end with the rear end of said front walking beam, an axle carried by the rear end of said rear walking beam, a trunnion intermediate the ends of said rear walking beam, a saddle bearing on said trunnion and a spring and shock absorber assembly supporting said vehicle frame on said saddle bearing.

12. A vehicle suspension system comprising a first walking beam resiliently pivotally mounted at one end to the frame of the vehicle, an axle mounted on an intermediate portion of said beam, a second walking beam having an axle mounted near one end thereof and having a trunnion resiliently supporting said vehicle on an intermediate portion thereof, the remaining ends of said walking beams being disposed in approximately vertical alignment, and means interconnecting said ends and exerting a restoring force on said beams tending to maintain said axles in parallel alignment to impart inherent stability to the system.

13. A vehicle suspension comprising a walking beam pivotally connected at one end to the frame of the vehicle through a resilient bushing and pin connection, an axle cushion seat on said beam, a road axle resiliently mounted in said cushion seat, a second walking beam, said two beams having adjacent ends in substantially vertical alignment, a tubular trunnion on said second walking beam for supporting said vehicle on a resilient member, a resilient bushing in said trunnion, a trunnion guide shaft in said bushing, a tension shackle interconnecting said adjacent ends of said beams, an axle cushion seat on said second beam, and a road axle resiliently mounted in said cushion seat, said axles being capable of self-steering through the resilience of said bushings and said cushion seats to reduce scuffing of the tires on curves, and said tension shackle being effective to exert a restoring force on said beams tending to maintain said beams in predetermined positions and alignments.

14. A vehicle suspension comprising a pair of walking beams resiliently mounted on a vehicle, a resilient pivotal connection between said beams, an axle cushion seat in each of said beams, and a road axle resiliently mounted in each of said cushion seats whereby said axles are capable of self-steering to reduce scuffing of the tires on curves.

15. A vehicle suspension comprising a walking beam pivotally connected to the frame of the vehicle through a resilient bushing and a pin connection, an axle cushion seat on said beam, a road axle resiliently mounted in said cushion seat, a second walking beam, a shackle connection between said beams, an axle cushion seat on said second beam, and a road axle resiliently mounted in said cushion seat, whereby said axles are capable of self-steering to reduce scuffing of the tires on curves.

16. In a vehicle suspension, a walking beam of hollow box construction, an integral transverse tubular trunnion on said walking beam presenting an external cylindrical surface for supporting said vehicle thereon, a resilient bushing in said tubular trunnion, trunnion guide means mounted in said bushing, an axle cushion seat on one end of said beam for mounting a road wheel axle, and a shackle connection at the other end of said beam.

17. A vehicle suspension comprising a first walking beam having a pivotal connection at one end to the frame of the vehicle, an axle mounted on the mid portion of said beam so that said pivotal connection carries one-half the weight supported by said axle, a second walking beam having a trunnion intermediate its ends supporting said vehicle frame on a resilient assembly, a second axle mounted on one end of said second walking beam, and a tension shackle interconnecting the other ends of said beams, the lever arm from said trunnion to said shackle being twice the length of the lever arm from said trunnion to said second axle so that said trunnion and resilient assembly carry three times the weight carried by said pivotal connection, and whereby the forces exerted on said shackle by the ends of said walking beams are equal and opposite so as to balance both the weight and torque reactions of said axles through said shackle.

18. A dual beam, dual axle vehicle suspension comprising a pair of pivotally interconnected walking beams each carrying an axle, a pivotal connection between one of said beams and the vehicle, and a resilient member supporting said vehicle on the other of said beams whereby said member is capable of accommodating vertical movements of either one or both of said axles.

19. A dual beam, dual axle vehicle suspension comprising a pair of walking beams each carrying an axle, said beams being pivotally interconnected to distribute equal loads on the two axles and allow interplay between the beams in passing over road irregularities, a pivotal connection between one of said beams and the vehicle, a trunnion on the other beam, and a resilient member supporting the vehicle on said trunnion to accommodate vertical movements of either one or both of said axles requiring raising or lowering of the trunnion support in addition to said interplay between the beams.

20. A vehicle suspension comprising a walking beam pivotally mounted at one end to the frame of the vehicle, an axle mounted on the other end of said beam, a trunnion in an intermediate portion of said beam, a resilient member supporting said frame on said trunnion, there being one such arrangement on each side of the vehicle associated with opposite ends of said axle, and a trunnion shaft carrying no load resiliently interconnecting the trunnions on opposite sides of the vehicle.

21. A vehicle suspension comprising a walking beam having a shackle connection at one end thereof with the frame of the vehicle, an axle mounted on the other end of said beam, a tubular trunnion in an intermediate portion of said beam, a resilient assembly supporting said frame on said trunnion, a transverse trunnion shaft carrying no load mounted in resilient bushings and in said trunnions, interconnecting walking beams of the type described on opposite sides of the vehicle, and vertical guide boxes on opposite sides of the vehicle receiving and guiding said shaft in vertical movement under the action of said resilient assemblies.

22. In a vehicle suspension, walking beams on opposite sides of the vehicle, a tubular trunnion in each of said beams, resilient assemblies supporting the vehicle on said trunnions, resilient bushings in said trunnions, a transverse trunnion shaft carrying no load mounted in said bushings to interconnect said walking beams, guide boxes adjacent said trunnions receiving and guiding said trunnion shaft in vertical movement under the action of said resilient assemblies, and an axle carried by said walking beams.

23. A convertible single axle-dual axle suspension for a vehicle comprising a walking beam mounting an axle at its rear end, a tubular trunnion intermediate the ends of said beam, a resilient member supporting the vehicle on said trunnion, and a vertical guide box on the vehicle adjacent said trunnion, there being one such assembly on each side of the vehicle, a transverse trunnion guide shaft carrying no load resiliently interconnecting the trunnions on opposite sides of the vehicle and slidably received for vertical movement in said guide boxes, and pivotal means on the front ends of said beams adapted for cooperation either with the vehicle frame to form a single axle suspension or with other walking beams carrying another axle to form a dual axle suspension.

24. In a vehicle suspension, an oscillating walking beam extending longitudinally of the vehicle, an integral transverse tubular trunnion on said walking beam presenting an external cylindrical bearing surface for supporting the vehicle, a resilient bushing in said trunnion, a trunnion guide shaft mounted in said bushing to be independent of the load on said trunnion, flexible means for mounting an axle on one end of said beam, and pivotal means at the other end of said beam for connection with either the vehicle frame or another axle-carrying member.

ROBERT W. POINTER.

REFERENCES CITED

The following references are of record in the file of this patent:

UNITED STATES PATENTS

| Number | Name | Date |
| --- | --- | --- |
| 1,989,745 | Farris | Feb. 5, 1935 |
| 2,096,530 | Alden | Oct. 19, 1937 |
| 2,193,567 | Pointer | Mar. 12, 1940 |
| 2,237,575 | Quartullo | Apr. 8, 1941 |
| 2,361,496 | Pointer | Oct. 31, 1944 |